United States Patent
Yamasaki et al.

(10) Patent No.: US 6,413,641 B1
(45) Date of Patent: *Jul. 2, 2002

(54) TREATED POLYETHYLENE TEREPHTHALATE POLARIZING FILMS FOR IMPROVED ADHESION IN OPTICAL PLASTICS

(75) Inventors: Nancy L. S. Yamasaki, Long Beach; Russell E. Evans, Chino Hills; Thomas Balch, Rancho Palos Verdes; Edward A. Beeloo, Torrance, all of CA (US)

(73) Assignee: Younger Mfg. Co., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,711

(22) Filed: May 10, 2000

Related U.S. Application Data

(63) Continuation of application No. 09/475,424, filed on Dec. 29, 1999, now Pat. No. 6,220,703.

(51) Int. Cl.[7] ............................. G02C 7/10; G02C 7/02; G02C 7/12
(52) U.S. Cl. .................... 428/412; 428/480; 428/423.7; 351/159; 351/160 R; 351/160 H; 351/103; 351/177; 351/41; 351/44; 351/49; 359/485; 359/493; 623/611; 623/617
(58) Field of Search ............................. 428/412, 480, 428/423.7; 351/159, 160 R, 160 H, 163, 177, 41, 44, 49; 359/485, 493; 623/611, 617

(56) References Cited

U.S. PATENT DOCUMENTS

| | | | |
|---|---|---|---|
| 3,833,289 A | 9/1974 | Schuler | 350/155 |
| 3,940,304 A | 2/1976 | Schuler | 156/245 |
| 4,090,830 A | 5/1978 | Laliberte | 425/117 |
| 4,268,127 A | 5/1981 | Oshima et al. | 350/337 |
| 4,274,717 A | 6/1981 | Davenport | 351/169 |
| 4,418,992 A | 12/1983 | Davenport et al. | 351/169 |
| 4,427,741 A | 1/1984 | Aizawa et al. | 428/332 |
| 4,617,207 A | 10/1986 | Ueki et al. | 428/1 |

(List continued on next page.)

OTHER PUBLICATIONS

Rodriguez, Ferdinand, "Principles of Polymer Systems," *Hemisphere Publishing Corporation*, Third Edition, pp. 20–27 and 484–487 (1989).

Hollander, A. et al. "The Influence of Vacuum–Ultraviolet Radiation on Poly(ethlene terephthalate)," *Journal of Polymer Science Part A: Polymer Chemistry*, vol. 34, 1511–1516 (1996).

Plastics Engineering Handbook of the Society of the Plastics Industry, Inc., Third Edition, *Reinhold Publishing Corporation*, New York, pp. 492–493 (1960).

Liston, Edward M., "Plasma Treatment for Improved Bonding: A Review," 35th Sagamore Army Materials Research Conference, pp. 199–218 (1988).

Glocker, David A. et al., "Plasma Sources for Polymer Surface Treatment," *Handbook of Thin Film Process Technology* (1996).

*Primary Examiner*—Leszek Kiliman
(74) *Attorney, Agent, or Firm*—Lyon & Lyon LLP

(57) ABSTRACT

An optical-quality plastic part is provided having a PET polarizing film integrally bonded thereto and, optionally, a hard coating integrally bonded to the PET polarizing film. In a preferred construction, the film may be surface treated, either physically and/or chemically, for integrally bonding the film to the optical-quality plastic material. Similarly, in another preferred construction, the film may be physically and/or chemically surface treated for integrally bonding a hard coating to the PET film. In either construction, the treatment may be effected by light irradiation.

29 Claims, 1 Drawing Sheet

U.S. PATENT DOCUMENTS

| | | | |
|---|---|---|---|
| 4,873,029 A | 10/1989 | Blum | 264/1.3 |
| 5,049,427 A | 9/1991 | Starzewski et al. | 428/40 |
| 5,051,309 A | 9/1991 | Kawaki et al. | 428/332 |
| 5,059,356 A | 10/1991 | Nakamura et al. | 252/585 |
| 5,071,906 A | 12/1991 | Tanaka et al. | 524/557 |
| 5,286,419 A | 2/1994 | Van Ligten et al. | 264/1.3 |
| 5,434,707 A | 7/1995 | Dalzell et al. | 359/485 |
| 5,641,372 A | 6/1997 | Okuno | 156/230 |
| 5,702,813 A | 12/1997 | Murata et al. | 428/332 |
| 5,718,849 A | 2/1998 | Maus et al. | 264/2.2 |
| 5,757,459 A | 5/1998 | Bhalakia et al. | 351/168 |
| 5,800,744 A | 9/1998 | Munakata | 264/1.7 |
| 5,808,721 A | 9/1998 | Wood et al. | 351/159 |
| 5,827,614 A | 10/1998 | Bhalakia et al. | 428/411.1 |
| 5,830,578 A | 11/1998 | Ono et al. | 428/446 |
| 5,882,774 A | 3/1999 | Jonza et al. | 428/212 |
| 5,926,310 A | 7/1999 | Tamura et al. | 359/350 |
| 5,965,247 A | 10/1999 | Jonza et al. | 428/212 |
| 5,991,072 A | 11/1999 | Solyntjes et al. | 359/361 |
| 6,220,703 B1 * | 4/2001 | Evans et al. | 351/163 |

* cited by examiner

TREATED POLYETHYLENE TEREPHTHALATE POLARIZING FILMS FOR IMPROVED ADHESION IN OPTICAL PLASTICS

CROSS-REFERENCE TO RELATED APPLICATION

This is a continuation of application Ser. No. 09/475,424, filed Dec. 29, 1999, now U.S. Pat. No. 6,220,703 B1, hereby incorporated by reference as if fully set forth herein.

BACKGROUND OF THE INVENTION

The field of the present invention relates to the use of treated polyethylene terephthalate (PET) polarizing films in optical-quality plastic parts.

A variety of polarizing films is known to exist. Conventional polarizing films, however, have not been comprised of PET. This fact is primarily due to PET's inert properties. The use of PET polarizing films in optical-quality polarized parts, as disclosed in the parent application, is therefore a unique innovation. Moreover, as disclosed in the parent application, such polarized parts can include ophthalmic lenses (semi-finished or finished prescription or non-prescription blanks, lenses, goggles, visors, shields), polarized facemasks or shields, and polarized display devices or windows that require low haze.

When a polarizer is incorporated in an optical-grade plastic part, it is difficult to effect secure and consistent adhesion of the total construct. Part of this difficulty can be attributed to the environmental instability of the conventional polarizer (polyvinyl alcohol polarizers, for instance, are sensitive to heat and humidity exposure). While polarizer stability is markedly improved by using PET polarizing film as disclosed in the parent application, the concern with separation between the polarizer and the rest of the plastic matrix remains. In fact, given the recognized inertness of PET, secure and consistent adhesion may be even more problematic.

Conventional techniques of incorporating a polarizer into an optical-grade plastic part have included the use of adhesives. However, placing adhesive on the polarizer film to secure it in the plastic matrix can lead to surface irregularities that compromise optical quality as well as bonding integrity. High temperature or humidity exposure, as well as the additional grinding, polishing and edging processes often associated with optical parts may weaken these bonds. In addition, adhesive layers are thick enough (0.5–10 $\mu$) to cause optical interference effects. These effects may include scattering within the layers that leads to unacceptable haze of the part, and refractive index mismatches that can cause interference fringing, image distortion, or chromatic aberration.

Nonetheless, there may be instances where one wants to secure a stable polarizer to an existing optical plastic by adhesively bonding it to a solid surface. The embodiments disclosed herein may therefore be beneficial for adhesively-bonded constructs because a) one uses the more environmentally stable PET-type polarizer film, and b) one can increase the bond strength between the adhesive and the inert PET surface by treatment geared to enhanced chemical bonding.

In the search for more stability with conventional polarizers, one approach has been to create a protected film by sandwiching the film between two layers of more robust optical plastics. Again, this construct suffers from the problems of bonding with adhesives. In addition, two more discrete layers of plastic within the optical-parts construct add four more surfaces for possible delamination, haze, and other optical-surface losses.

Another significant problem with the "sandwich" approach is that the construct cannot be radically curved without causing creases, folds, or unacceptable optical deformation. However, many optical applications require highly curved spherical, cylindrical, or multi-dimensionally curved surfaces. Examples range from wrap-around sunglasses to motorcycle or ski visors and face shields to curved device displays.

A thin but environmentally stable polarizing film that can be reproducibly positioned in or on an optical-quality plastic part would offer a distinct advantage. However, the adhesion between the polarizer film and the optical polymer must be excellent to accommodate likely events that would lead to delamination in highly curved parts. These likely events include pre-or post-shaping of the film/polymer construct; frame tensions at unusual angles; grinding, polishing, and edging stresses of a steeply or non-uniformly shaped part; and non-uniform stress distributions within a highly curved or non-uniformly shaped parts when subjected to thermal or other environmental changes.

In addition, it may be desirable to overcoat these optical parts for increased physical or optical performance. Common coatings include scratch or abrasion-resistance layers, anti-reflection coatings, mirrored coatings, and anti-fogging layers. Similar to the bond between the polarizer film and the optical part, it is again imperative that excellent adhesion between the polarizer film and the overcoat is achieved to ensure product integrity during use, or during post-processing steps such as shaping, grinding, or edging the part.

Accordingly, a surface treatment that changes the physical and/or chemical nature of the PET polarizing film for improved adhesion to optical-quality plastics, as well as to subsequent coatings, is desired. Preferably, this change should not be so transitory that reversion to the pre-treated, less-bondable surface properties occurs within normal manufacturing cycle times. More preferably, as a treated film may be stored for an extended time (days to weeks) before being placed within a plastic part, this change should not be so transitory that reversion to the pre-treated, less-bondable surface properties occurs within the stored duration. In addition, advantageous effects gained by the surface treatment should not be vitiated by any deleterious effects that may reduce the polarization properties of the film. Such deleterious effects to be avoided include chemical or physical changes to the film that can cause surface distortions that reduce the optical quality of the film and the resulting optical plastic part.

SUMMARY OF THE INVENTION

The preferred embodiments relate to an optical-quality plastic part construct having a PET polarizing film integrally bonded thereto and, optionally, a hard coating integrally bonded to the PET polarizing film after it has been bonded to the optical construct. As an added benefit, utilizing the techniques of the preferred embodiments disclosed herein, one may advantageously place the polarizer on or near the surface of the construct either by strengthened adhesive bonding or by positioning the polarizer at the front surface during the molding process without the degradation concerns inherent with the use of conventional polarizers.

In a preferred construction, the PET film is surface treated, either physically and/or chemically, for integrally bonding the film to the optical plastic material. One preferred embodiment involves changing the surface characteristics of one side of the PET film for improved adhesive bonding to existing optical plastic parts. Another preferred embodiment involves changing the surface characteristics of one side of the PET film for improved bonding to thermoplastic polymer mixes molded against the treated surface of the film.

Similarly, in another preferred construction, the PET film is physically and/or chemically surface treated for integrally bonding to a coating, such as a hard coating. Various other embodiments may utilize some but not all of the above elements, or may include additional refinements, while obtaining the benefit of an optical-quality plastic part utilizing PET film.

BRIEF DESCRIPTION OF THE DRAWING

The various objects, features, and advantages of the present inventions may be better understood by examining the Detailed Description of the Preferred Embodiments found below, together with FIG. 1, wherein.

DETAILED DESCRIPTION OF THE PREFERRED EMBODIMENTS

Figure 1:
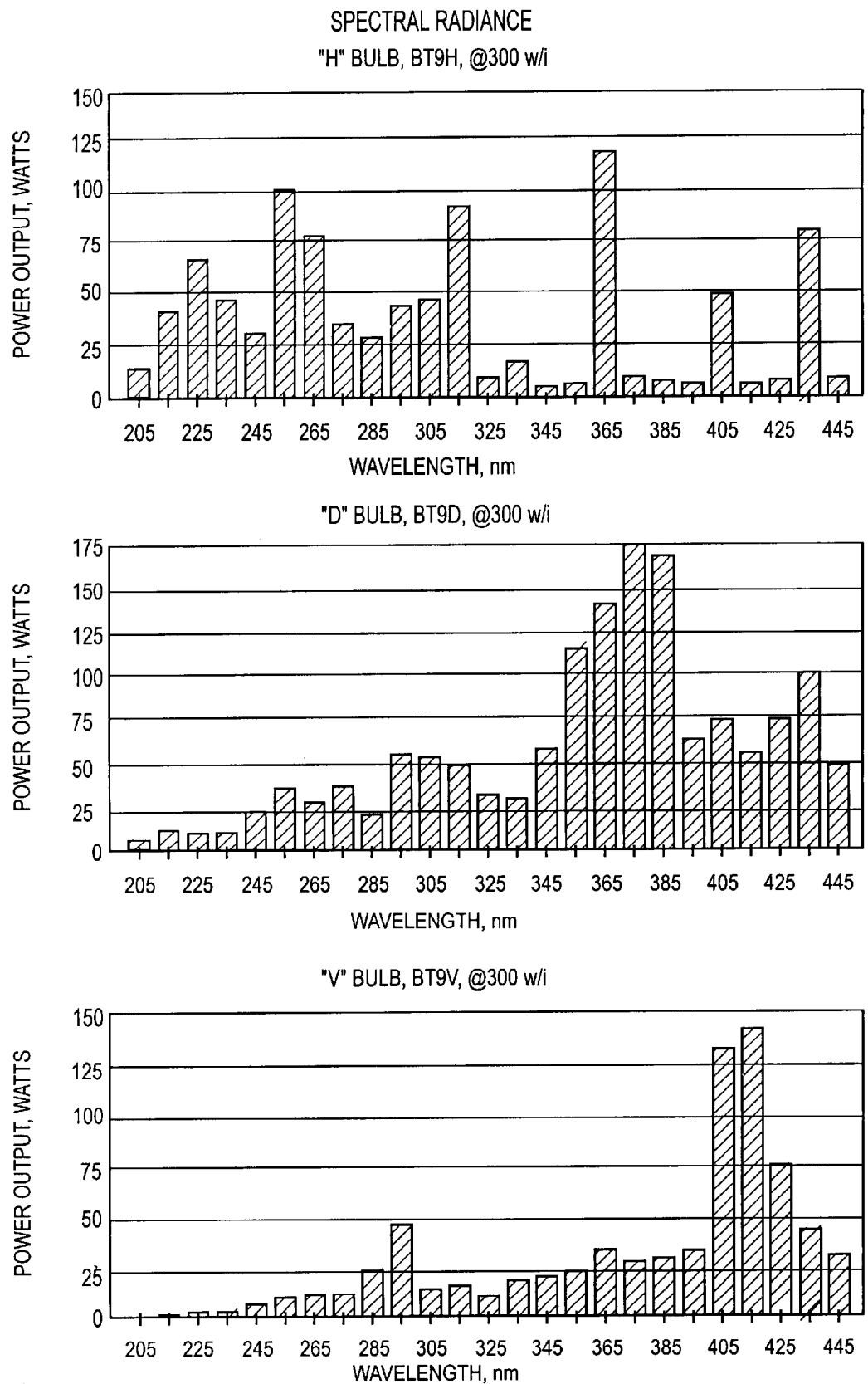
FIG. 1 illustrates the wavelength and light intensity distribution for selected lamps used for exemplary film treatment.

With each of the embodiments disclosed herein, the PET film should preferably be of very high optical quality to match ophthalmic standards, such as Developmental Film 99-04 distributed by R&S Enterprises of Yokohama, Japan with a polarizing efficiency of at least 96.3% and a transmission average (400–700 nm) of 14–18%. The inventors currently prefer the un-annealed form to the standard annealed form of Developmental Film 99-04 distributed by R&S Enterprises. The PET film may further comprise a crystalline or semi-crystalline naphthalene dicarboxylic acid, such as polyethylene naphthalate polyester or a copolymer derived from ethylene glycol, naphthalene dicarboxylic acid, and some other acids such as terephthalate, as described in U.S. Pat. No. 5,882,774, which patent is hereby incorporated by reference as if fully set forth herein.

Moreover, with each of the embodiments disclosed herein, the preferred optical-quality plastics are comprised of thermoplastic materials. With respect to these materials, they are preferably comprised of optical-quality polycarbonate (PC) resin such as that sold by Bayer, Inc. of Pittsburgh, Pa. under their trademarks Makrolon® DPI-1821 or 1815, or Lexan® OQ2720 manufactured by General Electric. The optical-quality plastic may comprise other thermoplastic materials such as polysulfones, polyethersulfones, polyamides, polystyrenes; and mixtures of polycarbonate and polyurethanes, polyesters, polysulfones, polystyrenes, amorphous polyolefins, and acrylics.

In many cases, it is desirable to overcoat the part with an abrasion-resistant coating. Such hard coatings may comprise a thermal or ultraviolet (UV) cured, hard coat. Ultraviolet hard coats such as SDC-1175 (SDC Coatings, Inc.) for thermoplastic lenses or LTI-SHC-175Y, 33% solids, (Lens Technology I, L.L.C.) typically used for thermoset lenses can be utilized. Thermal hard coats such as the hydroxylated organosilane 30% coating solution for polycarbonate (SCL International) can be used.

For the "integral bonding" (interpenetrated bonding or bonding at the molecular level) of the materials to occur, the film surface is prepared or treated. Different surface treatments or coatings may be necessary to achieve the best adhesion with different materials (e.g., optical-quality plastic or construct, or coating material). Thus, in order to increase the bonding of the inert PET film to the construct, physical and/or chemical treatments may be applied to the film. Fully disclosed in the parent application, such treatments may be sufficient alone to achieve good adhesion, or may be a pre-treatment prior to the application of an additional coating that further enhances integral bonding.

The purpose in any such treatment is to enhance chemical bonding, i.e., increase the number of compatible reactive sites for better bonding properties. Chemical modification of the surface may allow PET, which is initially hydrophobic, to react more readily with water or —OH containing compounds, which are often found in polymer, coating, and adhesive systems. Similarly, chemical modification can be selected to increase PET film's low surface energy, which means it will be capable of bonding to a much wider range of materials. Chemical treatment can include both modification of the surface reactivity of the PET film or coating of the PET film with a reactive layer.

The embodiments disclosed herein comprise treatments that have been found to be successful for improving adhesion of PET film to thermoplastic resins, as well as to hard coatings.

I. Overview of Adhesion Improvements

As disclosed in the parent application, the most successful treatment for adhering the PET film to thermoplastic resins or materials such as PC was to coat the PET film with a polyurethane coating immediately prior to placement within the molding cavity.

While this gave markedly improved adhesion, the polyurethane coating may have several limitations to practical use. First, best adhesion was achieved using an uncured coating on the film. Thus, the film must be handled while the coating is either wet or very tacky. It is generally difficult to keep such coatings clean. Even careful handling can lead to compromised optical quality due to inclusions, smudges, etc. Secondly, the surface of the film that will contact the molding surface should not be coated in this manner, or may one ruin the molding surface. This fact generally leads to either unacceptable manufacturing costs and limitations, or extra production steps of isolating the film surface from the polyurethane coating. Thirdly, a coating uniformity of ±0.2 $\mu$ is required to ensure that film nonuniformities do not cause unacceptable optical interference patterns on the product. This uniformity generally requires specialized equipment to achieve, and significant care to maintain these tolerances. While such constraints can be addressed or accommodated in a manufacturing process, obviously, alternative methods with less constraints are desirable.

Table 1, as shown below, illustrates a range of treatment conditions that were investigated. In particular, Table 1 summarizes alternative surface treatments and their effect on surface chemistry relative to their effectiveness for adhesion-promotion to either thermoplastic PC resin, or to subsequent hard coats.

TABLE 1

Analysis of Surface Treatments and Their Effect on Film Bonding

| PET Polarizer Film Treatment | Adhesion Ranking To PC | To UV Hard coat | To Thermal Hard coat | O:C Ratio | % Carbon in C—H, C—C Bonds | % Carbon in C=O Bonds | % Carbon in O—C=O Bonds | % O Singly Bonded | % O Doubly Bonded |
|---|---|---|---|---|---|---|---|---|---|
| Untreated | 4 | 4 | 3 | 23:76 | 65.9 | 0.0 | 14.0 | 48.6 | 49.8 |
| H bulb | 4 | 3 | — | 30:68 | 59.4 | 5.3 | 15.8 | 39.4 | 59.5 |
| D bulb | 3 | 1 | 1 | 29:69 | 60.4 | 5.1 | 13.9 | 44.5 | 54.1 |
| D bulb + NaOH wipe | 2 | 3 | — | 24.5:73.5 | 62.4 | 4.6 | 12.5 | 41.5 | 57.0 |
| V bulb | 1 | 3 | — | 25.5:73 | 65.4 | 2.8 | 12.8 | 45.0 | 53.9 |
| V bulb, 2 weeks later | 1 | — | — | 25.3:73.3 | 66.0 | 2.3 | 13.2 | 43.6 | 55.1 |
| V bulb, 4.5 weeks later | — | — | — | 23:77 | 67.9 | 2.4 | 11.5 | 43.0 | 55.2 |
| V bulb + NaOH wipe | 1 | — | — | 23:76 | 65.0 | 3.6 | 13.0 | 42.8 | 55.3 |

For ranking:
1 = meets adhesion requirements
4 = poor/no adhesion

As illustrated in Table 1, the main surface treatments involved the use of light irradiation. The origin of the light irradiation is a UV lamp, seen in Table 1 as "H bulb," "D bulb," and "V bulb." Different lamps allow one to determine wavelength dependent effects of treatment. For instance, shorter wavelength UV light is often considered more important than visible light for effecting changes to the chemical structure of a surface. Thus, lamps with different spectral distributions were used, as shown in FIG. 1. The amount of UV light intensity decreases as: H>D>V. Surprisingly, we found that the lamp with the least UV intensity (lamp V) gave the best adhesion results with thermoplastic materials. This finding is unusual because UV absorbs well in plastics, and one skilled in the art would expect that increasing the UV exposure would have effected increased structural or chemical changes favorable to bonding.

In addition, the combination of light irradiation with $N_aOH$ exposure was evaluated. The previous work, as disclosed in the parent application, had shown that NaOH exposure alone did not improve adhesion. However, if —OH functionality is important, it might be enhanced by the combination of UV and hydroxide addition.

Table 1 combines information from two sets of experiments. First, the Examples (detailed below) describe specific adhesion results for optical plastic constructs (in this case, semi-finished ophthalmic lenses) that were formed or overcoated following different PET film treatments. Secondly, Table 1 summarizes chemical changes observed for films treated under a range of conditions. From this information, we have identified particular treatments and chemical conditions that lead to improved adhesion to thermoplastics and to wet chemical hard coatings.

A. Details of Treatments for Comparison of Chemical Changes i. Main Treatment

In each case, the main treatment was exposure to high intensity light at atmospheric pressure. The three different 10" bulbs (Fusion UV Systems' models H, D, and V bulbs, rated for 400 W/in lamp housings) were substituted in a Fusion UV conveyor lamp housing, and irradiated the polarizing PET film for the same amount of time. The distance between the lamp and the film was 2.1", and the film was run over a cooling roller during irradiation. This roller was maintained at about 55° F. The film traversed the irradiation zone at a speed of ~1.5 ft/min, giving a residence time in the irradiation zone of about 15 seconds.

Samples had been treated within 1–2 days of analysis except where noted. Aged samples were examined to check for transient chemical changes.

Multiple samples were provided for consistency, as well as sampling positions of treatment across the lamp width and down the length of the film roll. These samples showed no variation outside experimental error limits. For reference, untreated samples were also analyzed.

ii. Secondary Treatment

Secondary treatment, when used, was a wet chemical treatment of the surface with NaOH solution. For these treatments, a 10% by weight solution of NaOH in deionized water was prepared. A lab-wiping cloth was then soaked in the solution, and rubbed by hand over the surface of the film for 15 seconds. The part was then thoroughly rinsed with deionized water, and allowed to air dry before further processing.

B. Analysis Technique

Flat pieces of PET polarized film were subjected to treatment conditions described above. These flat samples were analyzed by X-ray photoelectron spectroscopy using a VG ESCALAB Mk II instrument with a non-monochromatic $MgK_\alpha$ Z-ray source. Such analysis can determine the presence of atomic and molecular species, and by changing the angle of the amplifying beam, determine the depth of penetration for chemical changes. Samples were analyzed at 90°, 45°, 35° and 20°, which correspond to sampling depths of approximately 10, 5, 3 and 1.5 nm into the surface of the sample.

C. Results of Analysis

The untreated polarizer PET film had a slightly different ratio of oxygen (O) to carbon (C) or O:C than expected from the theoretical modeling of PET film. This result is not unusual with processed film, since trace materials may be added for better handling. The untreated film chemistry was used as the reference point for comparison, rather than the theoretical values.

Silicon (Si) was observed, which may be present in the film as an anti-blocking agent. The relative concentration of Si in the surface of the film was larger for all treatments than for the untreated film (1–1.5% versus 0.3%). Again, this result is not unexpected based on previous observations of other plasma-treated films. However, conditions with equal concentrations of Si but different distributions of other species gave different adhesion results. Therefore, there appears to be no indication that Si concentration changes of this magnitude determined subsequent adhesion either to PC or to hard coatings. With NaOH treatment, sodium concentration on the surface is also detectable.

Film treated with the H bulb (highest UV) showed the greatest increase in oxygen and decrease in carbon on the surface. This indicates surface oxidation by the higher UV exposure, as expected. What is unexpected is that this oxidation did not lead to better adhesion. The detailed analysis of molecular species provides more insight into the critical chemistry here. The H bulb treatment caused the most significant decrease in the amount of carbon that was bonded in the C—C, C—H form, with the highest shift into carboxylic (O—C=O) bonds, and also caused the largest shift from singly bonded to doubly bonded oxygen for the oxygen species.

The D bulb, with the second most intense UV concentration, gave the second highest increase in oxygen and decrease in carbon on the surface. Again, this result was accompanied by a reduction in the ratio of carbon bonded in the C—C, C—H forms, but with less shift in the distribution of oxygen species than that seen for H bulb treatment.

The V lamp exposure, preferred for bonding to PC, gave significantly smaller increases in oxygen content and decreases in carbon than those measured for the other lamps. These changes were still demonstrably different from the untreated film. Moreover, the distribution of various carbon species was significantly different for V bulb treatment versus the other treatments. Most notably, the relative proportion of C—C and C—H species was maintained at or near the values of the untreated film, even though the concentrations of other species changed.

For all treatments, a discernable increase in carbonyl (C=O) bonds was observed, as well as a small decrease in aromatic ring bonding. These changes indicate that all the treatments cause some polymer chain rearrangement and the formation of new linkages (carbonyl rather than just carboxylic bonds).

i. Aging Effect

For V and D lamp treatments, only a slight reversion toward the original concentrations of total oxygen and carbon species was observed over a 9–12 day period. In fact, the inventors found that film treated by V lamp exposure and molded in thermoplastic polycarbonate lenses 2–3 weeks later exhibits good adhesion. After 4 ½ weeks of storage following V bulb treatment, the overall oxygen and carbon concentrations were close to those of the untreated film. However, the relative distribution of various carbon-bonding species was changed by the D and V bulb treatments versus the untreated film, and did not revert to the original distributions even after 2–4 weeks of storage.

ii. Secondary Treatment Effect

With secondary NaOH treatment, the oxygen concentration decreases versus UV treatment alone, and carbon concentration increases. This decrease in oxygen is surprising, since one would expect hydroxide groups to be added to the surface. The more detailed analysis of chemical species shows that singly bonded oxygen populations are actually decreased with secondary NaOH treatment.

When NaOH treatment follows V bulb exposure, the magnitude of the changes in O:C ratio and relative distributions of species are smaller than for D bulb treatment. This is consistent with the observation that the additional step of NaOH treatment after V bulb exposure has no significant effect on subsequent adhesion.

II. Conditions that Lead to Improved Adhesion to Thermoplastic Materials

Surprisingly, for improved adhesion to PC thermoplastic resin, it is not necessary to extensively oxidize the surface or increase the availability of singly bonded oxygen. In fact, one can easily drive this surface change too far with higher UV exposure (D and H bulb treatments), and cause a marked change in surface O:C concentrations and an accompanying reduction in adhesion.

Instead, best adhesion may be obtained when a slight enrichment of oxygen occurs, and the relative population of carbon species in C—H and C—C bonding groups is maintained close to the value for the untreated film. When this relative population is maintained, the other important change that results in improved adhesion is bond rearrangement to include C=O species. Increases in doubly bonded oxygen species may play a secondary role in increased adhesion to this thermoplastic.

This is borne out by a comparison of adhesion results for V bulb versus D bulb with and without NaOH treatments. D bulb treatment alone causes a significant change in the O:C ratio, a large decrease in the relative population of carbon bonded in the C—C, C—H forms, and a large increase in C=O bonding. However, adhesion with this treatment is markedly less than V bulb treatment. Therefore, increased oxygen content and increased C=O bonding alone do not produce conditions for optimal adhesion. With secondary NaOH treatment, more carbon is present on the surface, and more of this carbon shifts to the C—C, C—H bonding structure. This leads to improved adhesion over D bulb treatment alone. A further shift of increased carbon, with increased C—C, C—H bonding but some residual C=O modification is obtained with V bulb treatment, and gives the best adhesion.

In contrast, if oxygen content was the only factor determining adhesion to thermoplastics such as polycarbonate, high UV intensity (H bulb treatment) would result in best adhesion. Thus, oxygen content is demonstrably not the primary factor in adhesion.

The ratio of singly to doubly bonded oxygen species is also only a secondary effect in thermoplastic bonding. This is shown by the fact that while V bulb and D bulb treatments give effectively the same ratio of these species, the adhesion is markedly better for V bulb treatment.

III. Conditions that Lead to Improved Adhesion to Overcoats

As disclosed in the parent application, best adhesion between subsequent hardcoatings and a lens substrate with PET polarized film integrally bonded at the front surface was achieved with light irradiation. The unusual result was that a D bulb, with less UV intensity, gave a better adhesion result than a higher UV intensity H bulb.

The present analysis of different treatment conditions shows that an increase in oxygen to carbon ratio on the surface does enhance adhesion. In this case, however, the ratio of singly to doubly bonded oxygen species is also important in combination with the total oxygen content. This understanding is shown by two comparisons. First, even at the highest oxygen concentrations (H bulb), if the singly-:doubly bonded oxygen ratio goes too low, adhesion is poor. Secondly, poorer adhesion was achieved for V bulb treatment, which has essentially the same distribution of singly:doubly bonded oxygen species as created by D bulb treatment, but a lower overall oxygen concentration. Hence D bulb treatment is preferred because it maintains a high ratio of singly to doubly bonded oxygen, with increased oxygen content on the surface.

IV. EXAMPLES

The limitations inherent with attempting to bond inert PET film and the advantages allowed by the preferred embodiments are more particularly described in the following examples that are intended as illustrations only since modifications and variations within the scope of the general disclosure will be apparent to those skilled in the art.

A. Adhesion to Thermoplastic Materials

In each case, PET polarizer film was moved through an area of irradiation at a speed of about 1.5 ft/min, which gives a residence time in the irradiance zone of ~15 seconds. Two different configurations of film handling were used: (1) formed film was vacuum mounted on a metal heat sink (~70° F.) and progressed through the irradiance zone on a conveyor; and (2) film in roll form was supported by a chill drum maintained at 55° F. as it traversed the irradiance zone.

Slower speeds (~1.2–0.7 ft/min) caused severe deformation or burning of the formed film due to excessive heating; more limited but unacceptable damage was also seen on the chilled roll of film. Speeds in the range of 2 ft/min or greater did not give as pronounced an improvement in adhesion as speeds of 1.2–1.7 ft/min.

After these irradiance treatments, the film was formed and cut to the curved shapes necessary for incorporation in thermoplastic polarized lens formation. In some cases, a secondary treatment of wiping the formed surface with 10% NaOH solution, then rinsing with water and air-drying was also used. In all cases, the formed parts were maintained at room temperature for hours to days before being positioned in a thermoplastic mold cavity, and allowing PC to flow against the back (treated) surface to form a lens under normal PC lens processing conditions.

i. Example I
Improved Bonding Without Liquid Adhesive

A 4B ("4B" or "4 base" commonly refers to the diopters of lens power associated with this convex radius of curvature, which references a refractive index of 1.53) curved PET film was positioned within a 4B single vision lens insert cavity of a PC-molding machine. Standard PC-molding conditions were used to inject PC into the same cavity to form a polarized single vision lens.

Adhesion of the lens/film combination was first judged roughly by probing the edge of a part with a razor blade. If no damage occurred, a cross-section bend test was performed. In this test, a narrow cross-section is cut through the thickness of the lens, a perpendicular cut scored into the lens from the back almost to the front surface, and then the lens is broken along the score line to determine where adhesion is lost.

| Treatment | Result |
| --- | --- |
| 1. H bulb | No increase in adhesion/fails bend test |
| 2. D bulb | Increase in adhesion/inconsistent bend failure |
| 3. D bulb + NaOH wipe | Increase in adhesion/inconsistent bend failure |
| 4. D bulb, but part aged 2 weeks | Same adhesion as treatments 2 and 3 |
| 5. V bulb | Increase in adhesion/PASSES bend, test (shears within film layer, not between film and PC) |
| 6. V bulb, but part aged 2–3 weeks | Same acceptable adhesion as treatment 5 |
| 7. V bulb + NaOH wipe | Equal results to V bulb alone: no advantage to additional treatment |

It is important to note that the irradiance treatments cause changes that give improved adhesion even after subsequent forming (heat and moderate pressure) operations, as well as after extended storage. These are distinct advantages for treatment techniques.

ii. Example II
Improved Bonding with Liquid Adhesive

In this Example, PET film was treated, then formed to 4D and 6D curves. The PET film surface and the surface of the lens to be bonded were both wiped with isopropanol, and allowed to air dry before application of a standard, liquid adhesive. In particular, a two-part optical adhesive HE 17017 (Hartel Plastics). was mixed as directed and a small amount applied to the PET film, which was then placed on the 4B and 6B polycarbonate molded lenses, respectively. The film was held in place with gentle pressure for a few minutes, then allowed to set in a horizontal condition.

Although not fully tack-free, adhesion was evaluated after 15 hours by probing the interface between the film and the lens with a razor blade.

| Treatment | Result |
| --- | --- |
| 1. Untreated, formed 4B film | Delamination propagates from probe point |
| 2. V bulb treated, formed 6B film | No propagation from probe point |

Thus, the V bulb treatment also enhances adhesion if one chooses to use liquid adhesives with pre-made thermoplastic optical parts.

B. Adhesion to Hard Coatings

Polycarbonate polarized lenses were prepared as above by treating PET polarizer film with V bulb irradiation, forming the treated film to proper lens curves, cutting it to size and placing it within the cavity of a standard thermoplastic injection-molding machine. Standard molding conditions for a clear PC lens were used to form the polarized lens. The polarized lens was then placed on a conveyor that moved the lens through the irradiance zone at 1.7 ft/min, 2.1" from the light source. No external cooling of the lens was employed. As in the parent application, adhesion of subsequent coatings was evaluated by the ASTM method of cross-hatch scoring of the hard coated surface, pressing 3M brand 810 tape firmly across the cut surface, and snap-tape testing.

i. Example I
Improved Bonding to UV Cured Coatings

Adhesion improvement to UV cured coatings, acrylate based, with up to 35% solids added was achieved. Common solid additives are silicated polymers, polymer particulates, or silica. Before coating, the lenses were cleaned by wiping the surface with an isopropanol/water mixture. A wet chemical hard coat (approximately 4 $\mu$ thick) was applied by standard spin-coating techniques, then cured by infrared (IR) and UV light exposure for 25 seconds. The polarized lens was not compromised in color or polarizing efficiency by exposure to UV light during the hard coating process.

| Treatment | Result |
| --- | --- |
| 1. D bulb | PASSES tape test |
| 2. D bulb + NaOH treatment | Slight increase over untreated/fails tape test |
| 3. V bulb | Moderate increase in adhesion/some removal in tape test. |

The following result is the result after an extended environmental test (lenses boiled 3 hours and subjected to tape test):

| Treatment | Result |
|---|---|
| 1. D bulb | PASSES tape test | ii. Example II

Improved Bonding to Thermally Cured Coatings

Adhesion improvement to thermally cured coatings, siloxane or hydroxylated organosilane-based chemistries, with or without added polymer or silica particulates was achieved. In these experiments, SCL International 30% solids polycarbonate coating was applied. Prior to coating, the lenses were cleaned with 3.5% NaOH solution and detergent, and then thoroughly rinsed and dried in with an IR heater.

| Treatment | Result |
|---|---|
| 1. Untreated | Some coating removed beyond cuts |
| 2. D bulb | Increased adhesion/PASSES tape test |

The following are the results after an additional environmental test (subjecting lenses to 1-hour boil and then tape testing):

| Treatment | Result |
|---|---|
| 1. Untreated | Significant coating removed beyond cuts |
| 2. D bulb | Only 1 small patch removed beyond cuts |

Thus, D bulb treatment has demonstrably increased adhesion for both UV and thermally cured coatings subsequently applied to PET polarized optical plastics. The fact that D bulb treatment resulted in better adhesion for coatings and V bulb treatment gave increased adhesion for thermoplastic PC again indicates that different treatments are optimal for different subsequent chemistries.

Accordingly, PET polarized optical-quality plastic parts, and PET film treatments that improve adhesion within such constructs are disclosed, wherein these treatments integrally bond the PET film to an optical-quality plastic material, as well as to an optional hard coating, without losing the PET film's required polarizing properties. While preferred embodiments are disclosed herein, many variations are possible which remain within the concept and scope of the invention. Such variations would become clear to one of ordinary skill in the art after inspection of the specification and drawings herein. The inventions therefore are not to be restricted except within the spirit and scope of the appended claims.

What is claimed is:

1. An optical-quality plastic part comprising:
   an optical-quality plastic material; and
   a polarizing film comprising polyethylene terephthalate, wherein the film is integrally bonded to the optical-quality plastic material.

2. An optical-quality plastic part according to claim 1, further comprising a hard coating, wherein the hard coating is integrally bonded to the film.

3. An optical-quality plastic part according to claim 1, wherein the optical-quality plastic material is comprised of a thermoplastic material.

4. An optical-quality plastic part according to claim 3, wherein the thermoplastic material comprises polycarbonate.

5. An optical-quality plastic part according to claim 1, wherein the film further comprises a crystalline or semi-crystalline naphthalene dicarboxylic acid polyester.

6. An optical-quality plastic part according to claim 1, wherein the film is treated with light irradiation.

7. An optical-quality plastic part according to claim 6, wherein a liquid adhesive is applied between the film and the optical-quality plastic material.

8. An optical-quality plastic part according to claim 1, wherein the film is treated with an uncured polyurethane coating.

9. An optical-quality plastic part according to claim 1, wherein the film is treated such that the relative distribution of carbon species bonded as C—H, C—C groups is maintained to about equal the untreated film distribution, and such that there is a shift of carbon species into C=O bonds.

10. An optical-quality plastic part according to claim 9, wherein the film is treated such that the relative distribution of carbon species bonded as C—H, C—C groups is maintained within 2% of the untreated film distribution, and such that there is at least a 2% shift of carbon species into C=O bonds.

11. A method of optical-quality plastic part manufacture comprising a polyethylene terephthalate polarizing film comprising the steps of:
    treating the surface of a polyethylene terephthalate polarizing film; and
    integrally bonding the film to an optical-quality plastic material to form an optical-quality plastic part.

12. A method of optical-quality part manufacture according to claim 11, wherein the surface of the film is treated such that the relative distribution of carbon species bonded as C—H, C—C groups is maintained to about equal the untreated film distribution, and such that there is a shift of carbon species into C=O bonds.

13. A method of optical-quality part manufacture according to claim 12, wherein the surface of the film is treated such that the relative distribution of carbon species bonded as C—H, C—C groups is maintained within 2% of the untreated film distribution, and such that there is at least a 2% shift of carbon species into C=O bonds.

14. A method of optical-quality part manufacture according to claim 11, wherein the treating step is effected by light irradiation.

15. A method of optical-quality part manufacture according to claim 14, wherein a liquid adhesive is applied between the film and the optical-quality plastic material.

16. A method of optical-quality plastic part manufacture according to claim 11, further comprising the additional step of treating the surface of the film for applying a hard coating thereon and applying the hard coating to the film, wherein the hard coating is integrally bonded to the film.

17. A method of optical-quality plastic part manufacture according to claim 11, wherein the optical-quality plastic material is comprised of a thermoplastic lens material.

18. A method of optical-quality plastic part manufacture according to claim 17, wherein the thermoplastic lens material comprises polycarbonate.

19. A method of optical-quality plastic part manufacture according to claim 11, wherein the film further comprises a crystalline or semi-crystalline naphthalene dicarboxylic acid polyester.

20. A method of optical-quality plastic part manufacture according to claim 11, wherein the surface of the film is treated for improved adhesion to an ultraviolet or thermally cured hard coating by light irradiation.

21. A method of optical-quality plastic part manufacture according to claim 16, wherein the surface of the film is treated for improved adhesion to an ultraviolet or thermally cured hard coating by increasing the relative ratio of oxygen to carbon species.

22. A method of optical-quality plastic part manufacture according to claim 21, wherein the relative ratio of oxygen to carbon species in the surface of the film is increased by at least 3%.

23. A method of optical-quality plastic part manufacture according to claim 16, wherein the surface of the film is treated for improved adhesion to an ultraviolet or thermally cured hard coating by increasing the relative ratio-of oxygen to carbon species without decreasing the singly to doubly bonded oxygen species by more than 5%.

24. A method of coating an optical-quality plastic part comprising a polyethylene terephthalate polarizing film comprising the steps of:

treating the surface of a polyethylene terephthalate polarizing film; and integrally bonding the film to a coating to form an overcoated optical-quality plastic part.

25. A method of coating an optical-quality plastic part according to claim 24, wherein the treating step is effected by light irradiation.

26. A method of coating an optical-quality plastic part according to claim 24, wherein the coating is an ultraviolet or thermally cured hard coating.

27. A method of coating an optical-quality plastic part according to claim 24, wherein the surface of the film is treated for improved adhesion to an ultraviolet or thermally cured hard coating by increasing the relative ratio of oxygen to carbon species.

28. A method of optical-quality plastic part manufacture according to claim 27, wherein the relative ratio of oxygen to carbon species in the surface of the film is increased by at least 3%.

29. A method of optical-quality plastic part manufacture according to claim 24, wherein the surface of the film is treated for improved adhesion to an ultraviolet or thermally cured hard coating by increasing the relative ratio of oxygen to carbon species without decreasing the singly to doubly bonded oxygen species by more than 5%.

\* \* \* \* \*